(No Model.) 2 Sheets—Sheet 1.

E. H. NORRIS.
BAGGAGE TRUCK.

No. 424,898. Patented Apr. 1, 1890.

Witnesses
A. Rupfzert
B. H. Lauck

Inventor
Elson H. Norris
by Franklin H. Hough
Atty.

(No Model.) 2 Sheets—Sheet 2.

E. H. NORRIS.
BAGGAGE TRUCK.

No. 424,898. Patented Apr. 1, 1890.

Witnesses.
A. Ruppert
D. H. Lauck

Inventor:
Elson H. Norris
by Franklin H. Hough
Atty.

UNITED STATES PATENT OFFICE.

ELSON H. NORRIS, OF BUCYRUS, OHIO.

BAGGAGE-TRUCK.

SPECIFICATION forming part of Letters Patent No. 424,898, dated April 1, 1890.

Application filed February 1, 1890. Serial No. 338,857. (No model.)

*To all whom it may concern:*

Be it known that I, ELSON H. NORRIS, a citizen of the United States, residing at Bucyrus, in the county of Crawford and State of Ohio, have invented certain new and useful Improvements in Baggage-Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in baggage-trucks, and it has for its object to generally improve upon the construction and at the same time to render more efficient and serviceable in operation this class of devices.

The invention has for its more immediate object to provide an improved baggage-truck so constructed that the rack or body of the truck may be readily raised or lowered, as desired, for convenience in loading and unloading, thus producing a truck which will be found to be especially adapted for use in handling baggage at railway-stations, as by lowering the body of the truck trunks or other heavy articles may be readily placed thereon, and when the baggage is to be transferred to the car the body of the truck may be elevated to the level of the floor of the car, thus avoiding the necessity of lifting the baggage and rendering it possible for a single attendant to readily and easily transfer to the car the heaviest articles.

To the above ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1:
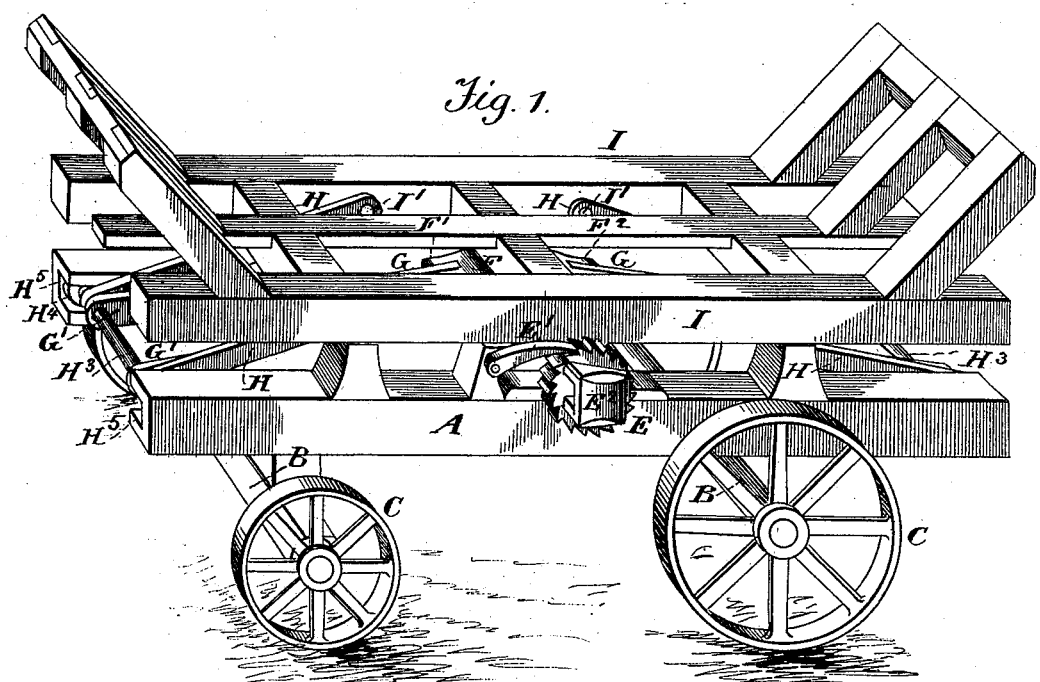
Figure 2:
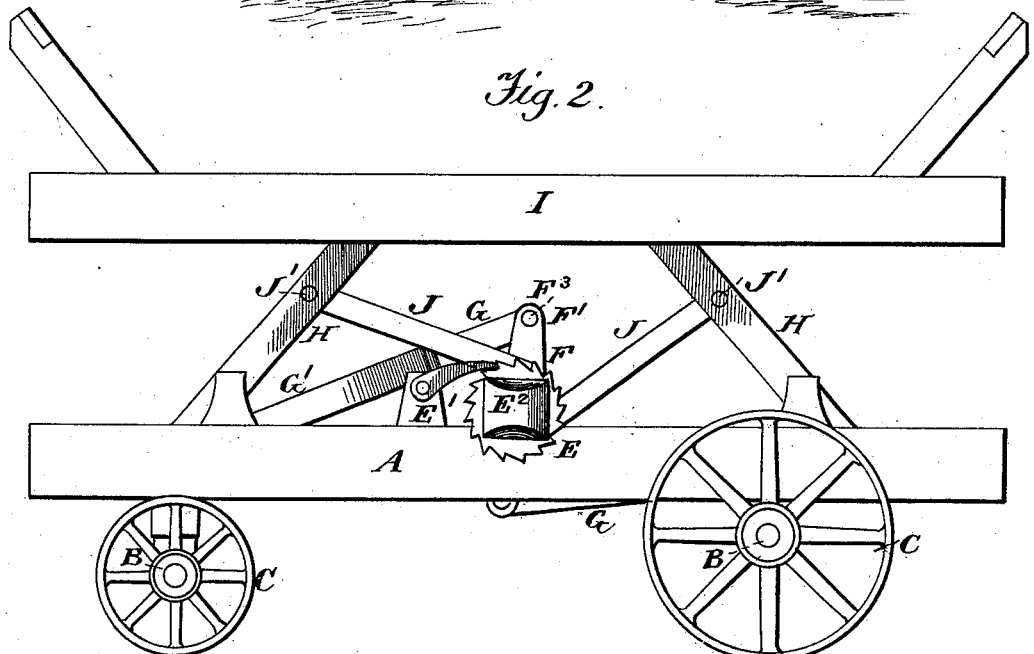
Figure 3:
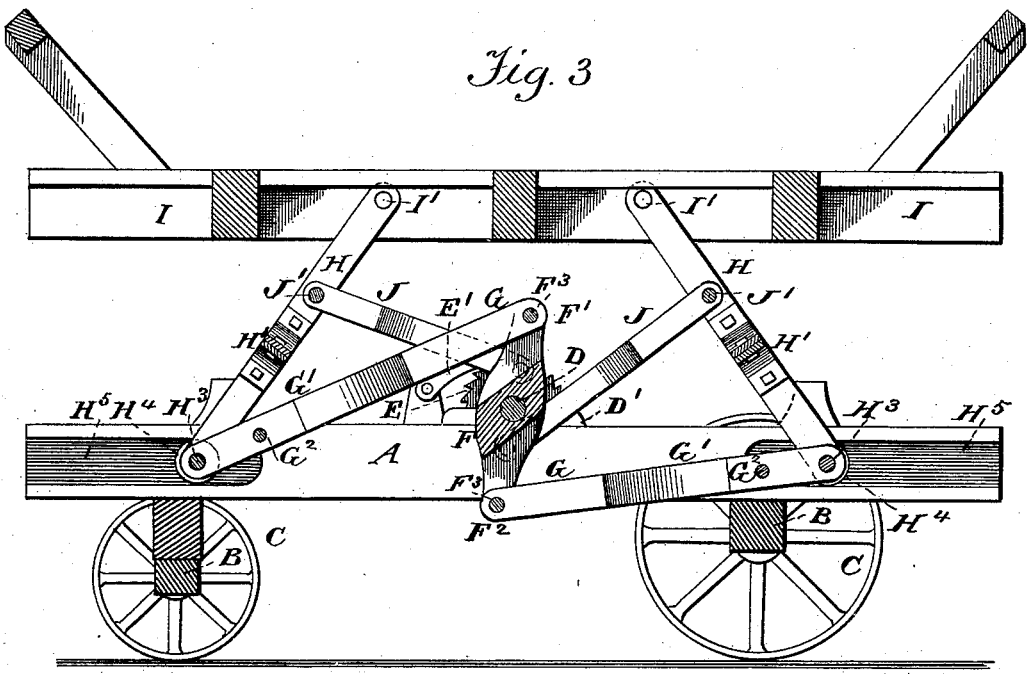
Figure 4:
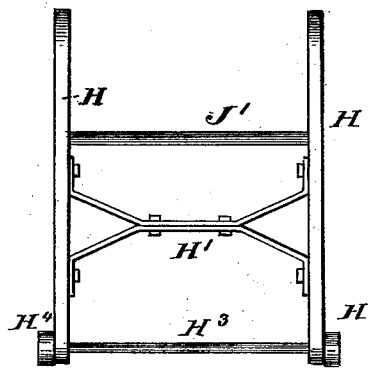
Figure 5:
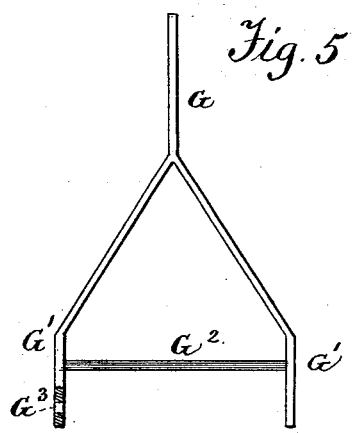

Figure 1 is a perspective view of a baggage-truck constructed in accordance with my invention, the rack of the truck being shown as lowered. Fig. 2 is a side view of the truck, in which view the rack is shown as raised. Fig. 3 is a central vertical longitudinal section through the truck with the rack raised. Figs. 4 and 5 are details which will be more fully hereinafter referred to.

Reference now being had to the details of the drawings by letter, A represents the side timbers of the frame, B B the axles, and C the wheels of the truck, all of which parts are of ordinary and well-known construction.

D is a transverse shaft, which is mounted within suitable bearing-boxes D', secured to the upper faces of the side timbers A at the longitudinal centers of said timbers.

E E are ratchet-wheels or pinions, which are secured upon the ends of the shaft D, and E' are dogs, which are pivoted to the timbers A and are adapted to engage the upper faces of the ratchet-wheels E, as shown.

The wheels E have cast integral therewith upon their outer faces the extensions $E^2$, which are provided with outwardly-inclined pockets or recesses for the reception of the end of the operating-lever, as will be presently explained.

Secured to the longitudinal center of the transverse shaft D is the rock-shaft F, which consists of two sections F' and $F^2$; and pivoted upon the shafts or rods $F^3$, uniting the ends of the sections F' and $F^2$, is one end of the lever G, provided at its opposite end with the arms G', connected at a point adjacent to their free ends by a strengthening bar or rod $G^2$, and at their extreme ends the said arms are provided with openings $G^3$.

H H are timbers, which are firmly united by the braces H'. At their lower ends the timbers H are sleeved upon the transverse shaft $H^3$, the ends of which shaft project a short distance beyond the timbers, and these projecting ends of the shaft have sleeved thereon the wheels $H^4$, which wheels are adapted to move within longitudinal grooves $H^5$, formed within the inner faces of the side timbers A of the frame of the truck at the ends of said timbers.

The upper ends of the timbers H are pivotally attached to the inner faces of the side timbers I of the rack or platform of the truck by means of stub-shafts I', which project inwardly from the inner faces of said timbers. The ends of the arms G' are sleeved upon the shaft H³, and it will thus be seen that when a rotary movement is imparted to the shaft D, carrying the double fulcrum F, the shaft H³, upon which the timbers H are sleeved, will be moved laterally through its connection with the fulcrum.

J J are levers, which are pivotally attached to the sides of the rock-shaft or fulcrum-block F, and at their opposite ends are sleeved upon the transverse shafts J', connecting the timbers H.

From the foregoing description of construction the operation of the device will be readily understood. The platform of the truck being lowered and baggage having been placed thereon, and the truck having been moved to the door of the car to which it is proposed to transfer the baggage, the attendant places the end of the operating-lever in the pocket upon the end of the central shaft upon either side of the truck, and by turning said lever to one side he imparts a rotary movement to said shaft and the rock-shaft carried thereby, and through the lever-connections between the said rock-shaft and timbers H the body or platform of the truck will be raised to the height desired, the engagement of the dogs E' with the teeth of the ratchet-wheels E serving to hold the shaft to which the wheels are attached against reverse movement. When it is desired to lower the rack, it may be readily accomplished by simply releasing the dogs from their engagement with the wheels.

Having thus described my invention, what I claim to be new, and desire to secure by Letters Patent, is—

1. The herein-described baggage-truck, the same comprising, in combination, a main frame, wheels, and axles, a rack, a transverse rock-shaft journaled in the frame, the timbers H, connected as described, pivotally connected at their ends to the side timbers of the rack and at their lower ends sleeved upon transverse shafts, the ends of which shafts are adapted to move within longitudinal grooves formed within the inner faces of the side timbers of the frame, and the levers connecting said timbers with the rock-shaft, whereby the rack may be raised or lowered by the rotation of the shaft, substantially as described, and for the purpose specified.

2. The combination, with the frame and the platform, of the transverse shaft, the rock-shaft F thereon, and the timbers H, pivotally connecting the platform and frame, the arms G G', connecting the said timbers with the rock-shaft, and the levers J J, pivotally connecting the sides of the rock-shaft with the transverse shafts connecting the timbers H H, substantially as shown and described.

In testimony whereof I hereto affix my signature in presence of two witnesses.

ELSON H. NORRIS.

Witnesses:
   EDWARD VOLLRATH,
   OTTO VOLLRATH.